Patented Jan. 26, 1943

2,309,522

UNITED STATES PATENT OFFICE 2,309,522

MANUFACTURE OF MOLDING COMPOUNDS

Barnard M. Marks, Upper Montclair, N. J., assignor to E. I. du Pont de Nemours & Company, Wilmington, Del., a corporation of Delaware No Drawing. Application May 2, 1940,
Serial No. 332,987

5 Claims. (Cl. 260—32)

This invention relates to the manufacture of molding compounds and, more particularly, to the preparation, from ethenoid resins, of molding compounds of desirable bulk density and granulation, and of uniform coloration.

The invention is concerned with molding compounds having a base of an ethenoid resin such as polystyrene, polyvinyl esters, and esters of acrylic acid and its homologues. Certain of these, notably polymethyl methacrylate, are highly useful as molding compounds.

For a molding compound to be fully satisfactory according to present day standards, it must be granular in form rather than pulverulent. That is, the particles should be largely retained on a 40 mesh screen with a minimum of very fine particles. In some instances, considerably coarser particles are desirable.

Further, a molding compound should have a bulk density of not less than about 0.4, and, preferably, not less than about 0.5, of the true density, i. e., the volume of a given weight of the granular molding compound should be not greater than 2.0 or 2.5 times the volume of the same weight of the substance in molded form. Bulk density is conveniently stated in terms of the weight in grams of a cubic inch of the granular molding compound in untamped condition. This ratio between volumes in granular and molded forms is the "compression ratio." At a given compression ratio, bulk density is, of course, directly proportional to specific gravity.

Particularly where the granular molding compound is to be pelleted prior to being molded, it is important that it contain no particles coarser than about 10–20 mesh and no large proportion of very fine particles. Also, the particles should not be of approximately spherical shape as this prevents them from being readily packed together in pelleted form.

A molding compound, quite obviously, should be uniformly colored and adapted to give a uniformly colored molded article if color is to be used at all.

The coloring of these resinous polymers in a uniform manner can sometimes be accomplished by the addition of coloring ingredients to the monomeric substance prior to its polymerization, but such methods are not of general applicability because of the disturbing effects of certain coloring ingredients upon the progress of polymerization and because of the destructive effects of catalysts of polymerization upon many otherwise desirable coloring materials. Furthermore, when comparatively small lots of polymer are required in a variety of different colors, it is frequently more economical to conduct the polymerization reaction on a large scale in the absence of coloring ingredients and then to color each smaller batch by the incorporation of suitable coloring ingredients with the uncolored polymer.

It has been found, however, very difficult to effect a uniform coloration by the incorporation of coloring material with the polymer by ordinary methods, of which the most commonly used, with these and other plastics, is that of intensive kneading, e. g., upon mixing rolls. This procedure is capable of effecting a satisfactorily homogeneous incorporation of resin and plasticizer and mold lubricant, if the latter are used, and yields a dense material which is readily ground to a granular molding compound of high bulk density, but the articles molded from this compound frequently have an objectionable mottled appearance. The reason for this difficulty is not entirely understood but lies perhaps in the tendency of polymers of this type to become depolymerized by temperatures of the order of those reached in such kneading operations.

Coloration of such resins in a satisfactory manner can in some cases be effected by grinding together the resin and coloring material, together with any plasticizer, in a ball mill, but this procedure has presented several practical drawbacks. Uniform coloration can be effected only by grinding to a very fine powder, which is objectionable to the molder because of its very low bulk density. Also the inevitable abrasion of the walls or balls, or both, may be sufficient to introduce haze into an otherwise transparent mixture. Furthermore, if more than a rather small proportion of plasticizer is to be used, the mixture tends to cake in the mill.

An object of the present invention is to provide a practical method of preparing, from ethenoid resins, molding compounds of satisfactory bulk density and granulation, and capable of yielding molded articles which are of uniform coloration. A further object of the invention is to provide a method of transforming pulverulent ethenoid resins into granular form adapted to be handled without difficulty in pelleting and molding equipment. Other objects of the invention will be apparent from the description given hereinafter.

The above objects are accomplished according to the present invention by forming a paste of a pulverulent ethenoid resin in a volatile non-solvent liquid, passing this paste between heated mixing rolls to dry and densify the resin, the temperature of said rolls being below that temperature at which the resin will form a continuous dough and, thereafter, comminuting said resin to granular size.

In a preferred embodiment of the invention, an aqueous emulsion of the ethenoid resin is mixed together with a water-insoluble coloring material dispersed in an aqueous vehicle, and the resulting aqueous suspension is then dried and densified by passing through heated mixing rolls and is subsequently ground to the desired size granules.

It has been found that production of a highly satisfactory granular molding compound can be readily produced by starting with the ethenoid resin in pulverulent form, either with or without coloring matter, modifying agents, and the like, wetting this pulverulent compound with a non-solvent volatile liquid, water being the most economical and suitable liquid, to form a paste, and then simply feeding this paste upon heated mixing rolls at their highest point, i. e., 90° from the bite of the rolls, at a suitable rate of feed, rerunning through the rolls the substantially dry material resulting from the first passage through the rolls to build it into thicker dense flakes or a friable sheet, and, subsequently, grinding the product to the desired fineness.

While the resin is in finely divided pulverulent form, coloring matter may be readily mixed with it uniformly and the densifying treatment does not disturb the distribution of the coloring matter, hence, a molding compound adapted to give an article of uniform coloration is easily obtained. By wetting the resin and not using too high a temperature, the small particles are compacted into dense flakes or a friable sheet but colloiding of the resin to give a continuous dough is avoided. These flakes or sheets which may be repassed through the rolls without wetting to densify them further, are readily granulated in a rotary cutter, or the like, to the desired granule size. It has been found characteristic of this dry and densified material that it does not fall to dust on being ground and that the ground product not only has a high bulk density but contains a low percentage of fines and is largely composed of non-spherical granules so that it is peculiarly well adapted to be preformed in commercial pelleting machines.

The present invention is applicable to ethenoid resins in pulverulent form regardless of the manner by which the resin is obtained in such form. The resin may be ground to reduce it to pulverulent form or the ethenoid monomer may be polymerized in liquid medium to give a resin in finely divided form originally, various processes of polymerizing ethenoid monomers to obtain the polymer in minute particles being known.

An outstanding advantage of the present invention is that the drying and densifying treatment does not disturb the distribution of the coloring matter and, therefore, the uniform distribution of the coloring matter in the pulverulent resin, which is very readily obtained, is carried over to the finished molded article. However, since the present process makes no provision to rectify a non-uniform distribution of coloring matter in the pulverulent resin to be subjected to the drying and densifying treatment, care must be taken to get the coloring matter uniformly distributed at the start if a mottled effect in the finished molded article is to be avoided.

An essential feature of this invention is the avoidance of overheating the resin in the course of drying and densifying it. Any temperature that could possibly cause depolymerization of the resin must be definitely avoided. Likewise, it has been discovered that a temperature that would cause colloiding of the resin, that is, conversion by heat and malaxation into a continuous dough as it passes through the rolls, must also be avoided and, as this temperature is lower than the temperature of depolymerization, it forms the limiting factor with respect to the temperature. On the other hand, a relatively high temperature but safely below that at which there would be any danger of colloiding of the resins, is preferably used as it accelerates the drying of the paste and, consequently, enables the paste to be fed to the rolls at a higher rate. Ordinarily, the rolls will be heated to about 110–130° C.

The following examples are given to illustrate specific embodiments of the invention, proportions being given by weight unless otherwise indicated:

*Example I.*—An emulsion of polymethyl methacrylate containing

|  | Parts |
| --- | --- |
| Polymethyl methacrylate | 500 |
| "Duponol" ME (dispersing agent) | 12.5 |
| Stearic acid (mold lubricant) | 2.5 |
| Residue of benzoyl peroxide, less than | 1.0 |
| Water | 1000 | is poured upon mixing rolls, heated to about 120° C., at such a rate that most of the water is driven off before the material has been carried to the bite of the rolls. The relatively dry material falls to a tray beneath after passing through the rolls. The mass in the tray is now fed through the rolls three more times, with the result that its drying is completed and it is densified into flakes or sheets, without malaxation or the formation of a continuous dough. Passage through a rotary cutter reduces this material to a granular form suitable for use in preforming and molding, and having a bulk density of 9.0 grams per cubic inch, which is about 0.46 of the density of an article molded therefrom.

*Example II.*—A solution of 33 parts of methyl methacrylate, 316 parts methanol, 0.26 part benzoyl peroxide, and 651 parts water is maintained at 65° C. for about 24 hours in a closed vessel. Polymerized methyl methacrylate separates as a finely divided spongy mass which, upon being shaken or stirred, is converted into a slurry. The finely divided resin is separated from the methanol-water vehicle by filtration, rinsed with water, if desirable for the purpose of recovering the methanol, and then dried and densified and ground as in Example I.

*Example III.*—To a solution of polymethyl methacrylate, 100 parts, in acetone, 650 parts, there is added, with stirring, 450 parts of denatured alcohol and then 1100 grams of a mixture of ethyl alcohol: water, 4:1. By this means the polymethyl methacrylate resin is precipitated in a fine-grained condition. To ensure against caking, there is added 1000 parts of water, and the slurry is passed through a filter. The resin is washed therein with water. The procedure of drying, densifying, and grinding is conducted as in Example I.

*Example IV.*—To the emulsion described in Example I is added, with vigorous stirring 16 parts of a solution of the water-insoluble dyestuff "Oil Red" (Color Index 258), 0.25 per cent in ethyl alcohol. The uniformly colored emulsion thereby produced is treated just as was the uncolored emulsion in Example I, and the result is a similar granular molding compound, having, however, a red color.

Articles molded from this granular molding powder are of uniform, unmottled transparent red color.

*Example V.*—The solution of dyestuff in alcohol described in Example IV is poured into 100 parts of water containing 1 part "Duponol" ME. The dyestuff is thereby precipitated in colloidal dimensions. This dispersion is stirred thoroughly with the emulsion of Example I and the colored emulsion is thereafter handled in the same manner as the emulsion in Example I.

*Example VI.*—An emulsion of plasticized polymethyl methacrylate contains

|  | Parts |
|---|---|
| Plasticized polymethyl methacrylate (polymethyl methacrylate, 360; dibutyl phthalate, 40) | 400 |
| "Duponol" ME (dispersing agent) | 10 |
| Butyl stearate (mold lubricant) | 4 |
| Residue of benzoyl peroxide, less than | 0.6 |
| Water | 1000 |

Titanium dioxide pigment, 30 parts, is rubbed to a smooth paste with water, and the paste is added, with vigorous stirring, to the emulsion of plasticized polymethyl methacrylate. The resulting colored emulsion is dried and densified on mixing rolls under conditions of temperature and manipulation that preclude the formation of a continuous dough. The densified compound is ground to a granular form having a compression ratio of 2.25. Articles molded from it are of uniform non-mottled white appearance.

*Example VII.*—Titanium dioxide pigment, 25 parts, and cobalt blue, 5 parts, are dispersed in water containing a dispersing agent, conveniently 100 parts of water containing 1 to 2 parts of sodium hexametaphosphate.

This dispersion of pigments in an aqueous vehicle is stirred into the emulsion of Example I, and the resulting colored emulsion is then converted into a granular molding compound by the procedure of that example. The result is a molding compound which, in granulation suitable for preforming, has a bulk density of 9.6 grams per cubic inch. The articles molded therefrom are of a uniform unmottled blue.

*Example VIII.*—An emulsion of polystyrene contains

|  | Parts |
|---|---|
| Polystyrene | 350 |
| "Duponol" ME (dispersing agent) | 10 |
| Residue of benzoyl peroxide | 0.5 |
| Water | 1000 |

To this is added, with stirring, 10 parts of a solution of "Wool Fast Yellow 3GL" (Color Index 636), 0.35% in methanol.

The subsequent procedure is as in Example I.

*Example IX.*—The following ingredients are milled to a fine homogeneous powder in a ball mill:

|  | Parts |
|---|---|
| Polymethyl methacrylate | 100 |
| Titanium dioxide | 1 |
| Cadmium red | 0.05 |
| Stearic acid | 1 |

The powder is moistened with water, and dried, densified, and ground in the manner described in Example I.

The "Duponol" ME used as a dispersing agent in several of the examples is a sodium lauryl sulphate preparation.

The above examples are merely illustrative and to a large extent are directed to various alternative methods of preparing the paste of pulverulent ethenoid resin in the volatile, non-solvent liquid. The actual carrying out of the drying and densifying of the molding compound will be varied somewhat according to the apparatus available, concentration and composition of the paste used, and the specific properties desired in the finished molding compound but such variations will be a matter of routine for those skilled in the art.

To work efficiently, the paste of wet resin should be well distributed along the length of the mixing rolls and the rate of feed adjusted so that the material, as it comes out of the bite of the rolls, is relatively dry. If only one passage of the material through the rolls is to be employed, the rate of feed must be reduced so that the material is practically completely dry as it emerges. It is preferred to pass the material through the rolls three or four times because this not only effects a complete drying of the material but increases its density which is an advantage.

The ordinary mixing rolls, preferably of stainless steel and which are heated by the passage of hot water or steam through internal channels, form the most preferred apparatus for carrying out the drying and densifying steps of the present invention but any apparatus that will give a similar drying and compressing action may be employed.

The present process is advantageously applicable to any ethenoid resin adapted for use as a molding compound. This includes not only the outstanding resins for this purpose, such as polymethyl methacrylate, polystyrene, and the like, but the various interpolymers and mixtures of polymers that have been developed to give improved molding compounds. As the examples illustrated, mold lubricants, plasticizers, and such modifying ingredients, may be incorporated in the paste to be processed.

When coloration of the resin is required, it will be effected by the use of a water-insoluble dyestuff or a pigment. Water-soluble dyestuffs should ordinarily be avoided due to the sensitivity to water of the resulting product. The examples illustrate various specific methods whereby the coloring matter may be uniformly distributed in the pulverulent resin.

Assuming that the volatile non-solvent liquid vehicle of the paste of finely divided or pulverulent resin is water—as is ordinarily and preferably the case—the coloring material is thoroughly dispersed in an aqueous vehicle and this dispersion is uniformly mixed with the paste, which thereby becomes uniformly colored. Other non-solvents can, less desirably, be used instead of water.

A water-insoluble dyestuff may be dissolved in a minor volume of an appropriate water-miscible solvent (or mixture of solvents) and the resulting solution may then be added to an aqueous vehicle containing a dispersing agent. The dyestuff, being insoluble in water, or in the dilute solvent which results from the admixture, is precipitated from solution, and the presence of the dispersing agent in the water causes it to be dispersed in particles of colloidal dimensions. A preferable alternative is to add the solution of dyestuff to water containing a dispersing agent and then to mix the resulting aqueous dispersion of dyestuff with the paste of resin or resin compound. Another alternative is to add the solution of dyestuff directly to the latter, which must contain a dispersing agent and which must be thoroughly stirred during the addition to ensure the immediate dilution of the solvent, which might otherwise coagulate the resin polymer, and to ensure the immediate dispersion of the dyestuff before it can cause any irregularity in the coloration of the resin.

The volume of solvent used must be small in comparison with the volume of water, both in order to ensure the dispersion of the dyestuff and, also, to obviate any objectionable softening of the resin by dilute solvent and any tendency of the resin, after subsequent drying, to retain residues of solvent. While the limiting ratio between solvent and water will be governed by the activity of a particular solvent toward a particular resin and by the manner in which the process is conducted, it will usually be desirable that the volume of the solvent be not greater than about 5 percent of that of the water, and preferably about one percent.

Pigments, in order to be suitable for use, must be of extreme fineness; pigments as prepared for conventional use in plastics are satisfactory in this respect. Preferably the pigment is dispersed in water by being stirred thoroughly with water containing a dispersing agent, and the resulting suspension of the ultimate particles of the pigment in unagglomerated condition is then mixed with the paste. Alternatively, the pigment may be rubbed with water to a paste which is then mixed with the resin paste containing a dispersing agent.

Suitable dispersing agents for use in the paste of resin or resin compound, and in the dispersing of the coloring material, may be selected from among many well known to the art. It is desirable, of course, to avoid the use of any one of these that may give rise to objectionable haze or discoloration. At the worst this is not a serious problem and the preferred embodiment of this feature of the invention makes no provision for the removal of the dispersing agent or agents after they have served their purpose.

Assistance in the dispersion of any of the ingredients may be had, when required, through the use of colloid mills, paint mills, or other mechanical devices known to the art.

Obviously both dyestuff and pigment may be used in a given case, if required for obtaining a desired effect.

The result of the admixture of finely divided resin or resin compound and dispersed coloring material is a uniform distribution of the ultimate particles of the latter and thus a uniform coloration of the former. The uniformly colored paste is then dried, densified, and granulated as has already been described. The uniform distribution of the coloring matter is not disturbed by these steps although it definitely is if the resin is allowed to colloid on the rolls; colloiding of the resin on the rolls must be avoided.

Where the ethenoid resin is produced in an emulsion, the emulsion may be coagulated, followed by filtering, and by drying and densifying as already described. Coagulation by chemical means may be objectionable in some cases in that residues of the coagulant may impair the quality of the ultimate molded articles, e. g., by introducing haze. Coagulation by water-miscible non-solvent, e. g., alcohol, is feasible. The process involving coagulation offers, ordinarily, no advantage over the process of direct drying. Usually it is necessary to dilute the emulsion before coagulating it, and the filtered coagulated compound is likely to contain no less water than the original emulsion and hence to be no more easily or rapidly dried. Thus the steps of drying and densification are not appreciably facilitated, and the step of coagulation and filtering has thus been of no practical advantage. If, however, the initial emulsion is for any reason excessively dilute, then the process involving coagulation may be advantageous through lessening the amount of water to be evaporated.

It will be recognized by those skilled in the art that proper judgment must be exercised in the choice of coloring materials having not only adequate fastness toward light and heat, but adequate resistance to alteration by the action of residues of polymerization catalyst associated with the ethenoid polymer. The time during which a coloring ingredient in contact with a polymerization catalyst will be exposed to heat is, however, relatively short, and hence many dyestuffs can feasibly be used, in carrying out the present invention, which would fail to stand up through the more prolonged heating of a polymerization reaction, in the presence of the initially greater amounts of catalyst.

An advantage of the present invention is that it provides a practical and economical method of preparing ethenoid resin plastics in granular form of high bulk density suitable for use in modern molding processes. A further advantage is that it provides a very practical means of producing a satisfactorily colored granular molding compound adapted to be molded into articles of uniform coloration, free from mottle. A still further advantage is that it provides a method of obtaining a granular molding compound, the individual particles of which are generally non-spherical in shape and, hence, adapted to be readily pelleted in present day pelleting machines.

As many apparently widely different embodiments of this invention may be made without departing from the spirit and scope thereof, it is to be understood that the invention is not limited to the specific embodiments thereof except as defined in the appended claims.

I claim:

1. Process of preparing a colored granular molding compound of high bulk density which comprises forming a homogeneously colored paste of polymethyl methacrylate in pulverulent form and water-insoluble coloring matter in a volatile, non-solvent liquid, passing said paste between heated mixing rolls to dry and densify said mixture of polymethyl methacrylate and coloring matter, the temperature of said polymethyl methacrylate being kept below the temperature at which said polymethyl methacrylate will colloid to form a continuous dough, and comminuting said dried and densified mixture to granular size.

2. Process of preparing a colored molding compound of high bulk density which comprises forming a homogeneously colored paste of polymethyl methacrylate in pulverulent form and a water-insoluble dyestuff in an aqueous vehicle, passing said paste between mixing rolls heated to about 110–130° C. to dry and densify said mixture of polymethyl methacrylate and water-insoluble dyestuff, and comminuting said dried and densified mixture to granular size.

3. Process of preparing a colored granular molding compound of high bulk density which comprises forming a homogeneously colored paste of polystyrene in pulverulent form and water-insoluble coloring matter in a volatile, non-solvent liquid, passing said paste between heated mixing rolls to dry and densify said mixture of polystyrene and coloring matter, the temperature of said polystyrene being kept below the temperature at which said polystyrene will colloid to form a continuous dough, and comminuting said dried and densified mixture to granular size.

4. Process of preparing a colored molding compound of high bulk density which comprises forming a homogeneously colored paste of polystyrene in pulverulent form and a water-insoluble dyestuff in an aqueous vehicle, passing said paste between mixing rolls heated to about 110–130° C. to dry and densify said mixture of polystyrene and water-insoluble dyestuff, and comminuting said dried and densified mixture to granular size.

5. Process of preparing a granular molding compound of high bulk density which comprises forming a paste of a resin in pulverulent form, said resin being selected from the group consisting of polymethyl methacrylate and polystyrene, in a volatile, non-solvent liquid, passing said paste between heated mixing rolls to dry and densify said resin, the temperature of said resin being kept below the temperature at which said resin will colloid to form a continuous dough, and comminuting said dried and densified resin to granular size.

BARNARD M. MARKS.